(12) United States Patent
Andriluka et al.

(10) Patent No.: US 9,058,663 B2
(45) Date of Patent: Jun. 16, 2015

(54) MODELING HUMAN-HUMAN INTERACTIONS FOR MONOCULAR 3D POSE ESTIMATION

(75) Inventors: Mykhaylo Andriluka, Saabrucken (DE); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 308 days.

(21) Appl. No.: 13/444,681

(22) Filed: Apr. 11, 2012

(65) Prior Publication Data

US 2013/0271458 A1    Oct. 17, 2013

(51) Int. Cl.
*G06T 17/00* (2006.01)
*G06T 7/00* (2006.01)
*G06K 9/00* (2006.01)

(52) U.S. Cl.
CPC ..... *G06T 7/0065* (2013.01); *G06T 2207/30196* (2013.01); *G06K 9/00342* (2013.01)

(58) Field of Classification Search
None
See application file for complete search history.

(56) References Cited

U.S. PATENT DOCUMENTS

2012/0063680 A1*    3/2012  Daisy ............................ 382/165

OTHER PUBLICATIONS

Andriluka, M.; Roth, S.; Schiele, B., "Monocular 3D pose estimation and tracking by detection," Computer Vision and Pattern Recognition (CVPR), 2010 IEEE Conference on, pp. 623-630, Jun. 13, 2010.*

Bangpeng Yao; Li Fei-Fei, "Modeling mutual context of object and human pose in human-object interaction activities," Computer Vision and Pattern Recognition (CVPR), 2010 IEEE Conference on, pp. 17-24, Jun. 13, 2010.*

Wang, Jack, Aaron Hertzmann, and David M. Blei. "Gaussian Process Dynamical Models." In Advances in Neural Information Processing Systems, pp. 1441-1448, 2005.*

Urtasun, R.; Fleet, D.J.; Fua, P., "3D People Tracking with Gaussian Process Dynamical Models," Computer Vision and Pattern Recognition, 2006 IEEE Computer Society Conference on, vol. 1, pp. 238-245, Jun. 17, 2006.*

Perez-Sala, Xavier, Sergio Escalera, Cecilio Angulo, and Jordi Gonzalez. "A survey on model based approaches for 2D and 3D visual human pose recovery." Sensors 14, No. 3 (2014): 4189-4210.*

M. Andriluka, S. Roth, B. Schiele. Pictorial structures revisited: People detection and articulated pose estimation. CVPR, 2009.

S. Divvala, D. Hoiem, J. Hays, A. Efros, and M. Hebert. An empirical study of context in object detection. In CVPR, 2009.

M. Eichner and V. Ferrari. Better appearance models for pictorial structures. In BMVC, 2009.

M. Eichner and V. Ferrari. We are family: Joint pose estimation of multiple persons. In ECCV, 2010.

P. Felzenszwalb, R. Girshick, D. McAllester, and D. Ramanan. Object detection with discriminatively trained part based models. PAMI, 32(9), 2010.

(Continued)

*Primary Examiner* — Sumati Lefkowitz
*Assistant Examiner* — Thomas A James
(74) *Attorney, Agent, or Firm* — Patterson & Sheridan LLP

(57) ABSTRACT

Techniques are disclosed for the automatic recovery of two dimensional (2D) and three dimensional (3D) poses of multiple subjects interacting with one another, as depicted in a sequence of 2D images. As part of recovering 2D and 3D pose estimates, a pose recovery tool may account for constraints on positions of body parts of the first and second person resulting from the correlated activity. That is, individual subjects in the video are treated as mutual context for one another.

28 Claims, 6 Drawing Sheets

(56) References Cited

OTHER PUBLICATIONS

P. Felzenszwalb and D. Huttenlocher. Pictorial structures for object recognition. International Journal of Computer Vision, 2005.

V. Ferrari, M. Marin-Jimenez, and A. Zisserman. Progressive search space reduction for human pose estimation. In CVPR, 2008.

V. Ferrari, M. Marin-Jimenez, and A. Zisserman. Pose search: retrieving people using their pose. In CVPR, 2009.

D. A. Forsyth, O. Arikan, L. Ikemoto, J. O. Brien, and D. Ramanan. Comp. studies of human motion: Part 1, tracking anf motion synth. Found. and Trends in Comp. Graph. and Vision, 1(2-3), 2006.

S. Gammeter, A. Ess, T. Jaeggli, K. Schindler, B. Leibe, L. van Gool. Articulated multi-body tracking under egomotion. In ECCV, 2008.

A. Gupta, T. Chen, F. Chen, D. Kimber, and L. S. Davis. Context and observation driven latent variable model for human pose estimation. In CVPR, 2008.

D. Hoiem, A. Efros, and M. Hebert. Putting objects in perspective. IJCV, 80(1), Oct. 2008.

C. Ionescu, L. Bo, and C. Sminchisescu. Structured svm for visual localization and continuous state estimation. In ICCV, 2009.

S. Johnson and M. Everingham. Clustered pose and nonlinear appearance models for human pose estimation. In BMVC, 2010.

H. Kjellstrm, D. Kragic, and M. J. Black. Tracking people interacting with objects. In CVPR, 2010.

M. W. Lee and I. Cohen. A model-based approach for estimating human 3d poses in static images. PAMI, 28(6), 2006.

C. Manfredotti, E. Messina, and D. J. Fleet. Relations as context to improve multi target tracking and activity recognition. In Int. Work. on Logic-Based Interp. of Context: Modeling and Apps, 2009.

T. B. Moeslund, A. Hilton, and V. Kruger. A survey of advances in vision-based human motion capture and analysis. Computer Vision and Image Understanding, 104(2-3), 2006.

S. Pellegrini, A. Edd, K. Schindler, and L. van Gool. You'll never walk alone: Modeling social behaviour for multi-target tracking. In ICCV, 2009.

D. Ramanan. Learning to parse images of articulated objects. In NIPS, 2006.

L. Raskin, M. Rudzsky, and E. Rivlin. 3d body-part tracking of multiple persons using a hierarchical body model. THEMIS, 2009.

L. Sigal and M. J. Black. Measure locally, reason globally: Occlusion-sensitive articulated pose estimation. In CVPR, 2006.

L. Sigal and M. J. Black. Predicting 3d people from 2d pictures. In Conf. on Art. Motion and Def. Objects (AMDO), 2006.

V. K. Singh, F. M. Khan, and R. Nevatia. Multiple pose context trees for estimating human pose in object context. In Structured Models in Computer Vision (CVPR), 2010.

G. W. Taylor, G. E. Hinton, and S. Roweis. Modeling human motion using binary latent variables. In NIPS, 2007.

T.-P. Tian and S. Sclaroff. Fast globally optimal 2d human derection with loopy graph models. In CVPR, 2010.

\* cited by examiner

MODELING HUMAN-HUMAN INTERACTIONS FOR MONOCULAR 3D POSE ESTIMATION

BACKGROUND

1. Field

Embodiments of the invention are generally directed to techniques for analyzing individuals depicted in recorded video sequences. More specifically, embodiments of the invention are directed to modeling human-human interactions to generate 3D pose estimations from 2D (i.e., monocular) images.

2. Description of the Related Art

Computer vision refers to a variety of techniques used to extract and interpret information from images. That is, computer vision is the science and technology of programming computer systems to "see." The computing system may use the extracted information to solve some task or to "understand" a scene depicted in the images.

One aspect of computer vision includes estimating 3D geometry from 2D (i.e., monocular) images. For example, recorded video typically captures images of a real world 3D scene projected into a sequence of 2D images (at some frame rate). Computer vision provides approaches for reconstructing the 3D structure or other information about the 3D scene from such a 2D video sequence.

Estimating and tracking human pose has been a focal point of research in computer vision for some time. Despite much progress, most research has focused on estimating pose for single well separated subjects. Occlusions and part-person ambiguities that arise when two people are in close proximity to one another make the problem of pose inference for interacting people a challenging task. One approach—tracking-by-detection—has shown results in some real world scenarios, but is typically restricted to tracking individual people performing simple cyclic activities (e.g., walking or running). Despite successes, tracking-by-detection methods generally ignore contextual information provided by the scene, objects, and other people in the scene. As a result, in close interactions, independent pose estimates for multiple individuals compete with one another, significantly degrading the overall performance of pose estimation tools.

SUMMARY

One embodiment disclosed herein includes a method for processing two-dimensional (2D) image data. The method may generally include identifying, at least a first person and a second person depicted in the 2D image data. The 2D image data depicts the first and second person engaged in a correlated activity. The 2D image data may be a single image of the two (or more) individuals engaging in the correlated activity or a sequence of video frames. This method may further include generating, by operation of one or more computer processors, a 2D pose estimation for at least the first person. The 2D pose estimation is generated, at least in part, to account for constraints on positions of body parts of the first and second person resulting from participating in the correlated activity.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
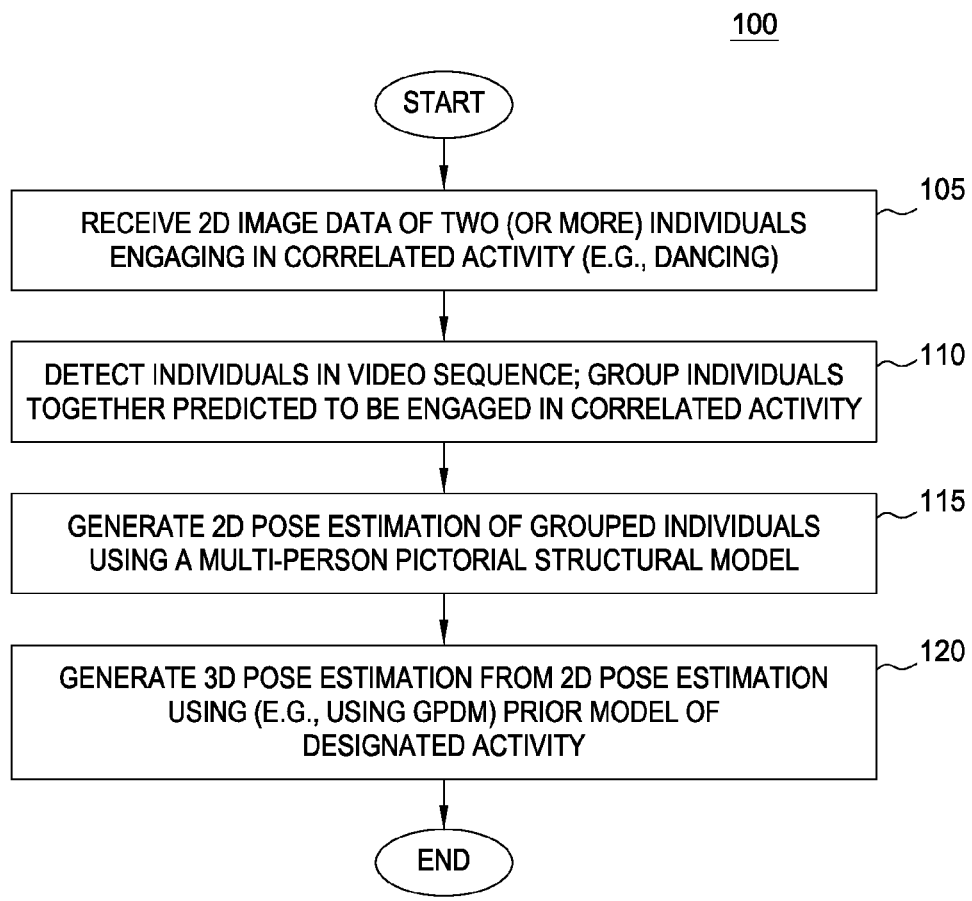
FIG. 1 illustrates a method for recovering a 3D pose estimation for individuals participating in a correlated activity, as depicted in 2D images, according to one embodiment of the invention.

Embodiments of the invention provide techniques for the automatic recovery of a three dimensional (3D) pose of multiple subjects interacting with one another, as depicted in a sequence of 2D images. As part of recovering 3D pose estimates, the techniques described herein explicitly account for interactions between people in the recorded video. More specifically, individual subjects are treated as mutual "context" for one another. One embodiment provides an automatic framework for estimating 3D pose of interacting people performing complex activities from monocular observations. The framework incorporates and analyzes the role of interactions, in the form of human-human context, at multiple levels of a multilayer process. That is, constraints in pose resulting from individuals engaged in a joint activity (e.g., dancing) is used to guide the recovery of 3D pose estimates from 2D video sequences of individuals engaging in that joint activity.

In one embodiment, a layered model combines bottom-up observations with top-down prior knowledge and context for robust 3D pose inference. A bottom layer may include a generic person detection process that detects bounding boxes of humans in a sequence of images. Once detected, individuals are grouped together into groups of interacting subject tracks based on spatial proximity and scale. In one embodiment, a middle layer provides a joint 2D multi-aspect pose inference for grouped individuals based on a multi person pictorial structure model. More specifically, one embodiment provides a multi-aspect flexible pictorial structure (MaFPS) model which facilitates the inference of 2D joint position over pairs of people. The aspects encode the modes of interaction and result in a non-tree structured model which provides an efficient approximate inference of 2D joint position in a sequence of images depicting the individual engaged in a correlated activity.

In one embodiment, the joint 2D multi-aspect pose inference of joint position provides a probability distribution predicting joint locations for the grouped individuals. The resulting 2D limb posteriors are used as likelihoods to obtain a maximum a posteriori (MAP) estimate of a 3D pose that is both likely and plausible according to the correlated activity-specific joint latent model. That is, a top-down approach is used to recover a 3D pose estimate for the 2D joint position estimate itself generated using the bottom-up approach described above. The top down approach includes a model derived from a training set of a correlated activity (e.g., dancing). In a particular embodiment, individual frame-by-frame results may be further refined by incorporating temporal consistency constraints.

Note, the actual type of correlated activity is used to recover a 3D pose estimate from a 2D pose estimate of joint position. That is, to recover the 3D pose estimate, the system uses a model of a designated activity being engaged in by subjects in video (e.g., subjects dancing). However, to recover the 2D pose estimates of joint position, the system assumes only that people are not moving independently and are engaged in some/any form of interaction. So, for example, to recover 2D pose estimates, the system recognizes that people are holding hands, but does not need to know whether they are walking, dancing, running, jumping, etc. while holding hands. In contrast, to recover the 3D model from the 2D pose estimates, the system uses trained model of a particular activity.

Note, the discussion below uses a pair of individuals dancing as an example of a joint, correlated activity which constrains 2D and 3D pose of the two individuals engaging in the activity. Of course, one of ordinary skill in the art will recognize that the techniques for recovering 2D and 3D pose are in no way limited to dancing, and that embodiments of the invention may be readily adapted to recover 2D and 3D pose estimates for two (or more) individuals engaging a variety of different correlated activities (whether complex, periodic, or otherwise). For example, the techniques described herein may be used to estimate the pose of athletes interacting with one another, e.g., boxers in the ring. Doing so may facilitate a virtual replay and analysis of their motion. Another example includes estimates of 3D pose for people involved in semi-periodic interactions (e.g., a play between defender and striker in an attempt to score a goal during a soccer match). Another example is estimates of 3D pose of people involved in a correlated but potentially spatially disjoint activity (e.g., a Simon says game).

Still another example embodiment includes pose recovery based on two (or more) individuals, where the correlated activity is players interacting with a video game that includes the joint motion of game participants as part of gameplay. To continue with dancing as a reference example, two game participants could dance with one another, while a gaming system renders images of the dancers on a screen. The game could score (or otherwise award points) based on how well the dancers performed a predefined dance routine. In this example, the pose recovery tool could improve the accuracy of a 3D model of the participants used to create an animated rendering of their movement as well as the accuracy of the scoring.

In some cases, the pose recovery for one individual may be (at least in part) interpolated and/or extrapolated based on estimates when the 2D pose estimation and/or resulting 3D pose estimation breaks down or is temporarily interrupted. Continuing with the video game example, if one participant became occluded or outside a field of view of a camera (or other sensing device) then an interpolation or extrapolation function could be used to fill in any gaps in the predicated 3D pose recovery of an individual engaged in a correlated activity. For example, interpolation or extrapolation techniques could be used when a game participant moved behind furniture, or when a person temporality moved in front of the game participant, etc). Of course, the interpolation and/or extrapolation techniques could be applied to other 3D pose recovery tasks. Consider again the sporting example, recovering elements of 2D and/or 3D pose of two fighters in a boxing ring could involve extrapolations and interpolations as the boxers' movement created transient occlusions of one another.

What makes this unique (gaming) is the pose recovery based on grouping people engaged in a correlated activity with one another, using proximity detections of interacting persons (either spatially or temporally/statistically). Those correlated activities imply a context that assists the pose recovery tool for each individual. The correlated activity is also used to infer a constrained post, which is used to recover and estimate a 3D pose.

Additionally, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

As noted above, embodiments of the invention provide approaches to estimate a 2D and 3D pose of people in monocular images or image sequences. In one embodiment, dependencies between poses resulting from people engaging in a correlated activity are explicitly modeled both in 2D and in 3D. Modeling interactions between individuals engaging in joint activity results in a more reliable 3D pose inference. Further, doing so allows 2D and 3D pose to be recovered from images of realistic complexity, such as those occurring in natural environments, obtained with monocular and potentially moving camera.

In one embodiment, a layered hierarchical framework combines bottom-up and top-down information. At a high level, the approach can be expressed as a generative model for 3D human pose that combines rich bottom-up likelihood with a top-down prior:

$$p(Y_1, Y_2 | I) \alpha p(I | Y_1, Y_2) p(Y_1, Y_2), \quad (1)$$

Where I is a set of image observations and $Y_i = \{y_i, d_i\}$ correspond to the parameters of 3D pose, $y_i$ and camera parameters required to project the pose into the image, $d_i$, for the $i^{th}$ person. The inference amounts to searching for a maximum a posteriori (MAP) estimate of $Y_1$ and $Y_1$ with respect to the model in Eq. (1). This model incorporates interactions at different levels and takes them into account both in the prior and likelihood terms. The 3D pose prior, $p(Y_1, Y_2)$, captures the activity induced correlations between poses of the two subjects and also models the relative orientation and position of the subjects. That is, the 3D pose prior constrains the 3D pose of the two subjects based on the joint activity in which they are engaged.

In one embodiment, a Gaussian Process Dynamical Model (GPDM) is relied on to learn parameters of the prior model from a set motion capture data of the correlated activity. Note, examples of a Gaussian Process Dynamical Model (GPDM) may be found in J. M. Wang, D. J. Fleet, and A. Hertzmann: Gaussian process dynamical models for human motion. Pattern Analysis and Machine Intelligence, vol. 30, pp. 283-298, no. 2 2008, which is hereby incorporated by reference in its entirety. Using a GPDM also allows the model of dynamics for stitching individual 3D poses together when tracking. To avoid depth and observation ambiguities, typical in monocular inference, a rich likelihood model, $p(I | Y_1, Y_2)$, may be defined that encodes consistency between the projected 3D poses and 2D posteriors defined over body part locations. Characterizing 2D posteriors, and hence the likelihood, involves inference over 2D pose of the body that takes into account spatial configuration of parts and discriminatively learned part appearances. Of course, one of ordinary skill in the art will recognize that GPDM is a just one example of a statistical model and that a variety of other alternative statistical models could be used.

For additional robustness and temporal consistency of 2D pose estimates (i.e., estimates of joint position in 2D images), the 2D model may be conditioned on position and scale of person detections. Formally, a set of auxiliary variables is introduced, including: $L_i = \{L_i^t\}$ which correspond to 2D configuration of a person's body and $D_i = \{D_i^t\}$ which correspond to position and scale of the $i^{th}$ subject in each frame of a video sequence (with t being the frame index). A first-order Markov assumption is made over $D_i$ and conditional independence of 2d poses $L_i$ given positions of people in each frame is assumed so that:

$$p(L_1, L_2, D_1, D_2 | I) = \quad (2)$$
$$\prod_t p(L_1^t, L_2^t, | D_1^t, D_2^t, I) p(D_1^t, D_2^t | I) p(D_1^t, D_2^t, | D_1^{t-1}, D_2^{t-1},),$$

The posterior, $p(Lt_1^t, L_2^t, |D_1^t, D_2^t, I)$ on the right-hand side of the equation corresponds to a joint multi-aspect flexible pictorial structure (MaFPS) model for the two interacting subjects, described in greater detail below. To account for uncertainty in the 2D pose estimates the likelihood in Eq. (1) may be defined by evaluating a projection of the 3D pose under the posterior distribution given by Eq. (2). The likelihood of the pose sequence may be defined as:

$$p(I | Y_1, Y_2) = \prod_{t,n} P_{L1,n}(\pi_n(Y_1^t)) P_{L2,n}(\pi_n(Y_2^t)), \quad (3)$$

where $P_{L1,n}$ denotes the marginal posterior distribution of the $n^{th}$ body part of the configuration $L_1$ and $\pi_n(Y_1^t)$ corresponds to the projection of the $n^{th}$ part into the image. In order to obtain a MAP estimate for the posterior in Eq. (1) a multi-stage approach may be adopted. First, the auxiliary variables $D_i$ and $L_i$ are inferred and then the 3D poses using local optimization are inferred, while keeping the auxiliary variables fixed. Inference of pose may be further simplified by observing that in most sequences person detection and tracking and grouping procedure are reliable enough to allow $D_i$ to be inferred first by obtaining modes of:

$$p(D_1^1, D_2^1) p(D_1^1, D_2^1 | I) \prod_2^T p(D_1^t, D_2^t, | I) p(D_1^t, D_2^t | D_1^{t-1}, D_2^{t-1})$$

before inferring posterior over $L_i$ conditioned on $D_i$.

FIG. 1 provides an overview of the process for estimating 3D pose from 2D image data for individuals engaging in a correlated joint activity. More specifically, FIG. 1 illustrates a method 100 for recovering a 3D pose estimation for individuals participating in a correlated activity, as depicted in 2D images, according to one embodiment. The steps of method 100 generally correspond to the layered model for combining bottom-up observations with top-down prior knowledge and context for robust 3D pose inference introduced above—beginning from the bottom layer and working up.

As shown, the method 100 begins at step 105, where a computing system running a pose recovery tool receives a 2D image data (e.g., a single image or a video sequence) depicting two (or more) individuals engaging in a correlated activity (e.g., dancing).

Once received the pose recovery tool may evaluate the frames of the video sequence (steps 110, 115, and 120) to recover a 3D pose estimate for individuals depicted in the received video sequence. Note, while a 3D pose estimate may be recovered for each frame, in some cases, the tool may be set as a matter of preference to generate 3D pose estimates for every nth frame or for specific selected frames. Further, in one embodiment, the method may be used to recover an inference of 2D joint position of the individuals in the video without also recovering an estimate of 3D pose for the inferred 2D joint position. That is, in some cases, the pose recovery tool may be configured to perform steps 110 and 115 without also performing step 120 for the received video (or for designated frames of the received video). Of course, the pose recovery tool may be configure to allow a user to specify whether to recover 2D joint positions or 3D pose estimates as well as specify which frames the 2D joint positions and/or 3D pose estimates are recovered.

At step 110, the pose recovery tool identifies individuals in the received video sequence. Further, the individuals projected to be engaged in the correlated activity may be grouped together. Doing so results in both tracks of individuals across multiple frames as well as an association between two (or more) tracks. Again using dancing as an example, the pose recovery tool may identify two individuals dancing with one another across multiple frames.

More specifically, as a first step towards inferring 2D or 3D poses of people, positions of potentially interacting people are recovered from the video sequence and tracked over time (i.e., over multiple times). Doing so generally corresponds to estimating the values of the variables $D_1$ and $D_2$ in Eq. (2), above. In one embodiment, the pose recovery tool may employ a tracking-by-detection approach to find tracks of people by connecting hypothesis obtained with a person detector. One example of a detection technique is described in P. Felzenszwalb, R. Girshick, D. McAllester, D. Ramanan: Object Detection with Discriminatively Trained Part Based Models. IEEE Transactions on Pattern Analysis and Machine Intelligence, Vol. 32, No. 9, September 2010, which is hereby incorporated by reference in its entirety. Of course, other approaches for detecting people in frames of video may be used.

Figure 2A:
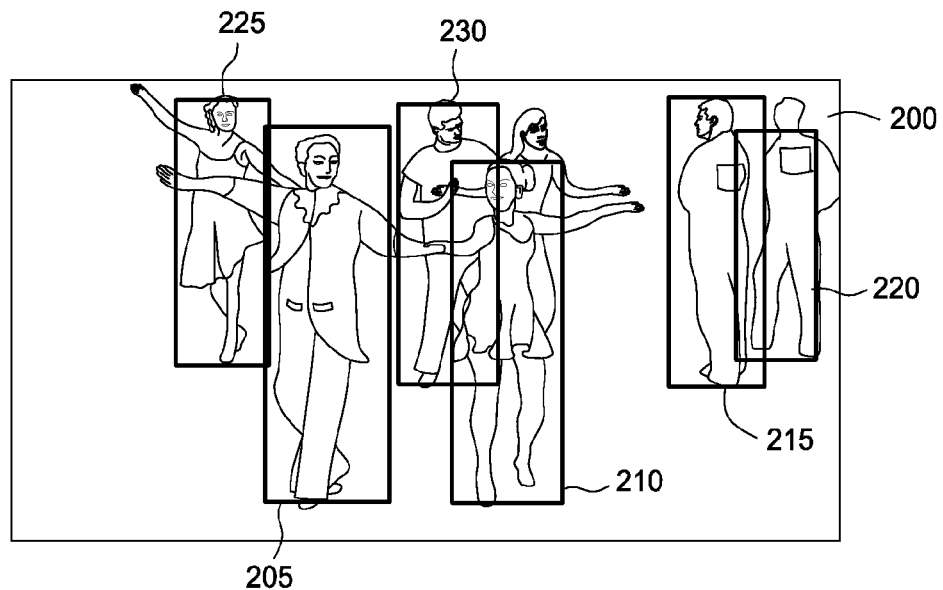
FIGS. 2A-2B illustrate an example of detecting and grouping individuals participating in a correlated activity (e.g., dancing), as depicted in 2D images, according to one embodiment of the invention.

FIG. 2A shows an example of people detected from an image. As shown, an image 200 of video includes a bounding box 205, 210, 215, 220, 225, and 230, placed around each person detected in the image. The tracking-by-detection approach results in a track, i.e., a bounding box for a given person in the video across a sequence of frames. Once tracks of people are detected, the pose recovery tool may group people predicted to be engaged in a correlated activity with one another. In one embodiment, people are grouped together based on both proximity within the video frames and on similarity of scale. That is, two people close to one another and shown as a similar size/scale in the video may be predicted to be engaging in the correlated activity (e.g., dancing with each other).

For example, assume the set of people detection hypothesis in frame t is denoted by $h_t$ and a track corresponding to a sequence of selected hypothesis over T frames is denoted by $h_\alpha = \{h_{\alpha_t}^t; t=1, \ldots, T\}$, where the index of selected hypothesis at frame t is denoted by $\alpha_t$. In such a case, the pose recovery tool identifies two such tracks that are both consistent over time (with respect to position and scale) and at the same time are likely to correspond to the interacting persons. In one embodiment, spatial proximity of detections may be used as the main cue for interaction and focus of finding two tracks that maintain close proximity to one another over all frames.

Figure 2B:
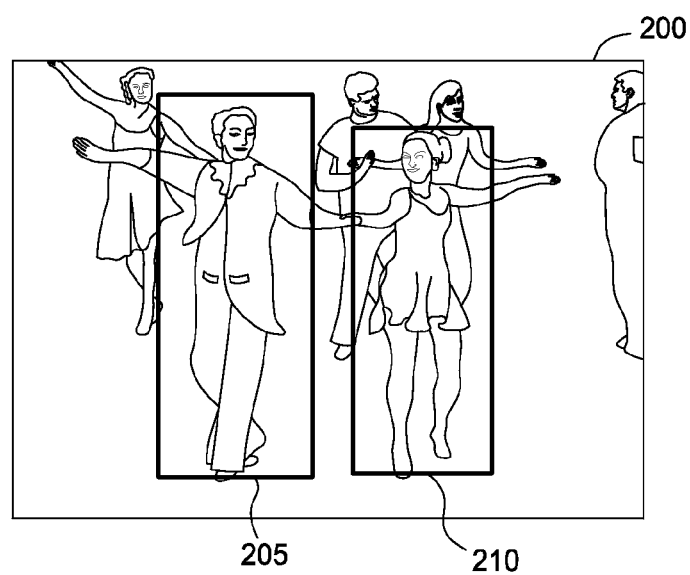

In one embodiment, the pose recovery tool may be used to jointly estimate the assignment of hypothesis to both tracks. However, a greedy procedure has proven to work well in practice. For example, using a greedy procedure, the pose recovery tool may identify tracks of individual people by optimizing the following objective with Viterbi-decoding: $p(h_\alpha) = p(h_{\alpha_1}^1) \Pi_{t=2}^T p(h_{\alpha_t}^t) p(h_{\alpha_t}^t, h_{\alpha_{t-1}}^t)$, where the unary terms correspond to the confidence score of the person detector and the binary terms are zero-mean Gaussian with respect to the relative distance in position and scale. Given a set of single person tracks, tracks having a closest distance are associated with one another. In one embodiment, "distance" between two tracks $h_{\alpha_1}$ and $h_{\alpha_2}$ may be defined as the average distance between corresponding track hypothesis:

$$D(h_{\alpha_1}, h_{\alpha_2}) = \frac{1}{t_2 - t_1} \sum_{t=t_1}^{t_2} \|x(h_{\alpha_1, t}) - x(h_{\alpha_2, t})\|, \quad (4)$$

where $x(\bullet)$ is the centroid of detection and $t_1$ and $t_2$ are the first and last frame contained in both tracks. In one embodiment, the pose recovery tool only associates two tracks with distance less than a predefined threshold and links tracks with a smallest distance if multiple tracks are sufficiently close to each other to satisfy the threshold. Once associated, tracks are assigned to each other are merged into disjoint groups. And pose may be inferred independently for the people in each such disjoint group. For example, FIG. 2B shows the image 200 after the tracks for bounding boxes 205 and 210 (bounding two people dancing with one another) have been grouped together. In this example, the two individuals depicted in bounding boxes 205 and 210 have been associated as a disjoint group, and are presumed to be engaging in the joint activity (i.e., the two people are presumed to be not just dancing, but dancing with each other). Based on this association the pose recovery tool may recover a 2D estimate of joint position for the individuals depicted in bounding boxes 205 and 210. As described in greater detail below, the 2D joint position estimates may take into account the fact that the individuals are dancing with one another. That is, the 2D estimates constrain the possible 2D joint positions based on the correlated activity (in this example dancing). Thus, each person provides context for the other person when the pose recovery tool estimates 2D joint positions for these individuals.

Referring again to method 100 shown in FIG. 1, at step 115, the pose recovery tool generates a 2D pose estimation of grouped individuals. In one embodiment, the 2D pose estimation may be generated using a multi-person pictorial structural model. In one embodiment, the likelihood of 3D body pose may be defined using estimates of the 2D projections of the body joints. At a high level, the pose recovery tool determines a probability distribution for multiple locations in the image (e.g., at a set of sampled pixel locations). The probability distribution represents the probability that a given joint is depicted at a given location within the image.

Further, the pose recovery tool may use tree-structured pictorial structures (PS). However, embodiments (1) add flexibility to parts allowing the model to effectively capture foreshortening and different views of the person with respect to the camera and (2) condition the pose estimates on person detections to deal with image over-counting and encourage consistent pose estimates over time, and (3) utilize a collection of multi-person pictorial structure models that encode modes of interactions between two people (aspects). This new model is referred to herein as a multi-aspect flexible pictorial structure (MaFPS) model.

Note, for purposes of discussion, a basic pictorial structures model is described, followed by a detailed description of the MaFPS model, relative to the basic model. In a basic pictorial structures model, the 2D configuration of subject i in frame t may be denoted by $L_i^t = (l_{i0}^t, \ldots, l_{iN}^t)$, where $l_{ij}^t = (x_{ij}^t, \theta_{ij}^t, s_{ij}^t)$, correspond to the image position, rotation and scale of the $j^{th}$ body part; N=10 denotes the total number of parts, which are typically chosen to correspond to torso, head, lower and upper legs, forearms and upper arms. Given the image evidence, the posterior over 2D body configuration is proportional to the product of likelihood and prior terms:

$$p(L_i^t|I) \propto p(I^t|L_i^t)p(L_i^t), \quad (5)$$

In the absence of interactions, the tree structured pictorial structures model may be relied on to represent the posterior over $L_i^t$. In particular it is assumed that the likelihood term in the Eq. (4) factorizes into the product of individual part likelihoods $p(I^t|l_i^t)$ and that the prior is given by:

$$p(L_i^t) = \prod p(1_{i0}^t) \prod_{(i,k) \in E} p(1_{ij}^t | 1_{ik}^t) \quad (6)$$

where E is a set of edges in the 2D body model that capture kinematic constraints on the 2d body part configurations. Note, a uniform prior on $l_{i0}^t$ may be assumed. Doing so allows the pose recovery tool to model a pairwise relationships between parts. One example of an approach for modeling using pairwise relationships is described in P. Felzenszwalb, D. Huttenlocher: Pictorial Structures for Object Recognition. International Journal of Computer Vision, Vol. 61, No. 1, January 2005, which is hereby incorporated by reference in its entirety.

Since representing joint posterior over 2D configurations is generally considered to be intractable, for 3D likelihood in Eq. (3), this posterior may be approximated as a product over posterior marginals of individual body parts as given by the following equation:

$$p(L_i^t|I) \approx \Pi_n p(l_{in}^t|I).$$

The use of traditional 10-part pictorial structures (PS) model, described above, presents a number of challenges for recovering 3D pose from video depicting multiple individuals. As it focuses on individual people, the traditional PS model: (i) does not properly model foreshortening of parts because parts are represented with rigid rectangles of fixed size and (ii) is not effective in inference of poses across variety of camera views. To address (ii), some view-based and multi-pose models have been introduced. However, these typically only provide a collection of pictorial structures (PS) models trained with view-specific or pose-specific spatial priors. In the present case, where the pose recovery tool is after jointly modeling multiple people, such mixture models will result in an exponential number of PS models.

Figure 3A:
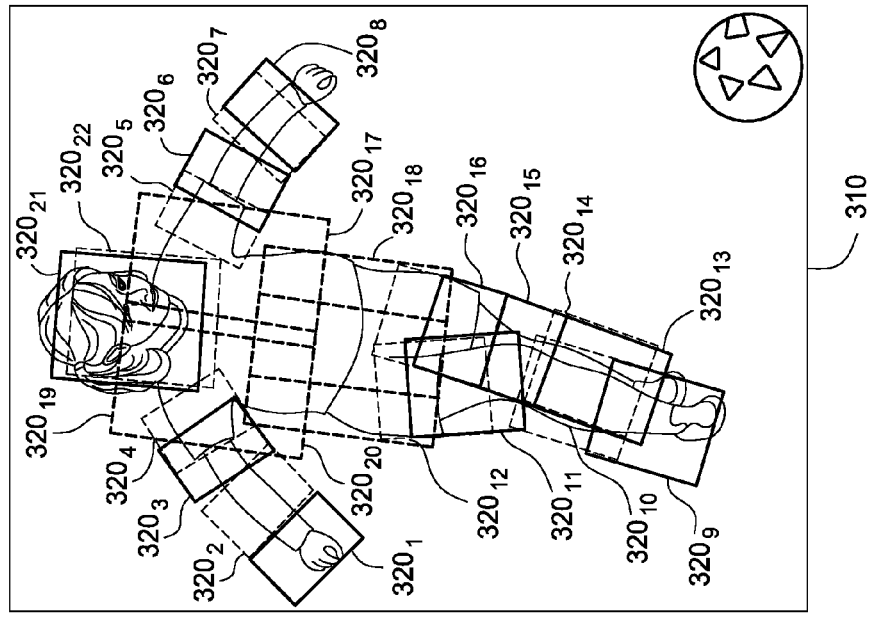
FIGS. 3A-3C illustrate an example of generating an estimate of 2D pose for individuals participating in a correlated activity, as depicted in 2D images, according to one embodiment of the invention.
Figure 3A:
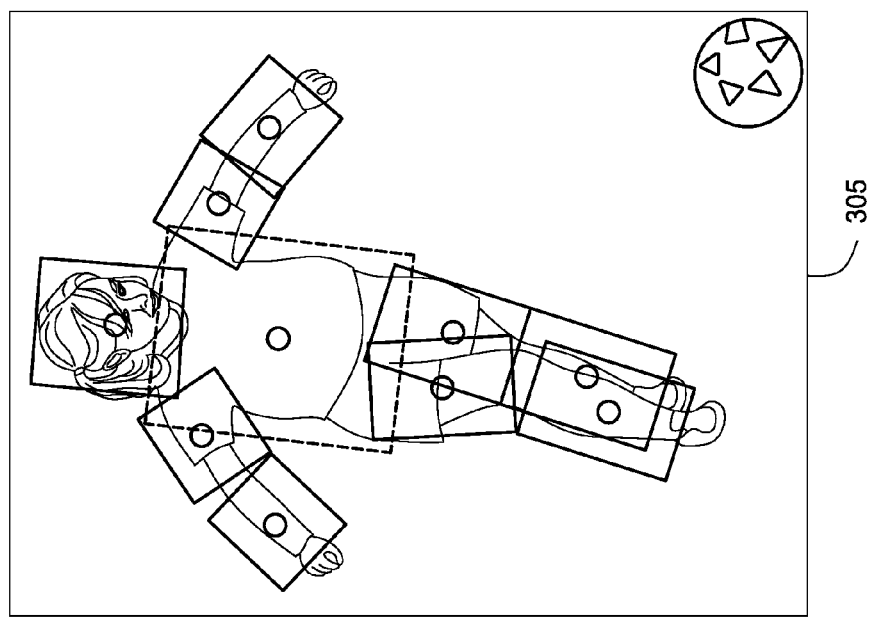

Instead of these approaches, one embodiment provides a more flexible extension to the basic PS model. Such a model is able to deal with both (i) foreshortening and (ii) diverse camera views using one coherent PS model. In such an embodiment, human body parts may be represented with an extended 22-part pictorial structures model. An example is shown in FIG. 3A. As shown, an image 305 displays a 10-part PS model superimposed over a person depicted in an image. Specifically, an image of a woman playing soccer. In this example, each modeled part is bound by a rectangle—resulting in two part models for each limb and a single rectangle for each of the head and torso.

In contrast, image 310 shows an extended 22-part model. In the extended 22-part model, each limb is represented with two parts (half limbs) attached to the ends of the limb. These parts are allowed to slide along the part (i.e., along the limb) axis with respect to each other, capturing the foreshortening of the limb. For example, in FIG. 3A, an image 310 shows a 22-part flexible PS model superimposed over the image of the woman playing soccer. As shown, half-limbs for body parts $320_{1-16}$ may slide with respect to one another and the torso is modeled using 4 flexible parts $320_{17-20}$. The head of the girl is modeled by two parts which can also slide relative to one another to account for out of plane rotations of the head with respect to the camera. Modeling the torso using four parts $320_{17-20}$ parts attached to shoulders and hips allows the results in a PS model capable of representing various torso orientations by shifting these parts with respect to each other. In one embodiment, the four torso parts $320_{17-20}$ are connected in a star-shape pattern. Note, in this example that the resulting 22-part PS model better adjusts to the orientation of the torso which also resulted in better estimate for other body parts.

One challenge in recovering pose of multiple people using pictorial structures is double-counting. The double-counting problem, in this context, refers to the fact that since the two subjects are conditionally independent the model is likely to find location of the two subjects, one on top of another situated on the most salient person in the image. Note, the same is true for models with weak conditional dependence between parts as those imposed by interaction aspect. While the 3D pose likelihood may use the posterior, weak modes that appear on the less salient subject still cause problems. In one embodiment, to address the double-counting issue one can use: (1) repulsive potentials that penalize substantial overlap between parts or (2) resort to pixel-wise occlusion reasoning by introducing and marginalizing over image layers.

Alternatively, however, another approach stems from an observation that the person detection and grouping carried out as part of step 105 performs well in separating out interacting couples. To ensure that body-part hypothesis of both subjects are well represented and have substantial probability mass in the posteriors, 2D pose inference process may be conditioned the estimated positions of both people given by $D_1^t$ and $D_2^t$. This approach is somewhat similar to a progressive search approaches for space reduction for human pose estimation. In one embodiment, the pose recovery tool assumes that positions of body parts are conditionally independent of $D_i^t$ given the position of the root node $1_{i0}^t$, so that conditioning the model on $D_i^t$ corresponds to replacing the uniform prior $p(l_{i0}^t)$ in Eq. (6) with conditional distribution, $P(l_{i0}^t|D_i^t)$, which assumes a Gaussian distribution is centered on the image position given by $D_i^t$.

The multi-person flexible pictorial structural model incorporates interactions as a form of constraints on positions of the body parts of the interacting people. Clearly, depending on the type of the interaction, positions of different body parts of people involved will be dependent on each other. For example, during the waltz arms of both subjects are typically close together, whereas during the crossover motion in cha-cha partners will only hold one hand. The interactions do not need to be physical, but can also be statistical in nature. For example, in a game of "Simon Says", kids may be driven to assume a similar posture or perform similar motion without physically touching one another. In order to accommodate these modes of interaction embodiments of the invention introduce an interaction aspect variable at which will specify the mode of interaction for the frame t. Given the interaction aspect, the joint posterior distribution over configurations of interacting people is given by:

$$p(L_1^t, L_2^t, |I^t, a^t) \propto p(I^t|L_1^t)p(L_1^t, L_2^t|a^t), \quad (7)$$

where independence of the appearance of both people is assumed. Doing so allows the joint likelihood to be factorized into the product of likelihoods of each person. As a result, the joint prior on configurations of people is given by:

$$p(L_1^t, L_2^t | a^t) = \prod_{i=1}^{2} p(L_i^t) \prod_{(n,m) \in W} p(l_{1n}^t, l_{2m}^t)^{a_{nm}^t}, \quad (8)$$

where $p(L_i^t)$ is a tree structured prior defined in Eq. (6), W is a set of edges between interacting parts and $a_{nm}^t$ is a binary variable that turns the corresponding potential on and off depending on the type of interaction. The interaction potentials are given by: $p(l_{1n}^t, l_{2m}^t = N(x_{1n}^t - x_{2m}^t | \mu_{nm}, \Sigma_{nm})$, and specify the preferred relative distance between the positions of the interacting parts. The multi-person flexible pictorial structural model treats the interaction aspect at as a latent variable and marginalizes over it during the inference. Note, this approach also assumes a uniform prior on at so that the marginalization step corresponds to the summation over the conditional posterior distributions given by Eq. (8). Further note that one skilled in the art will also recognize that the interaction variable itself can be inferred during inference if this caries meaningful information for the final application. For example, the model can infer if subjects are in fact holding hands.

In one embodiment, the pose recovery tool models four aspects that correspond to hand holding; these include: (1) no hand holding, (2) left hand of one subject holding right hand of the other subject, (3) left hand of one subject holding left hand of the other subject, and (4) two-hand hold. These interaction aspects result from the target application of evaluating recorded video dancing couples. That said, one of skill in the art will readily recognize the that the joint 2D pose estimation model is general and applicable to a broad variety of other interactions and may be adapted accordingly. For example, interactions do not need to be physical, but can also be statistical in nature.

Note, however, modeling dependencies between subjects comes at a cost of more expensive 2D joint position inference process. In a tree-structured model, inference can be made efficient with the use of convolution. The dependencies between subjects can introduce loops which makes exact inference prohibitively expensive. In order to make the inference tractable, the following two-stage procedure may be relied upon. In the first stage interaction factors are simply ignored and the inference is performed only in the tree-structured model. A fixed number of positions is then sampled for each body part of each subject from the marginal of the tree-structured model and repeat the inference with the full model using the sampled positions as a state-space. Note, while the number of sampled positions may be set as a matter of preference. Sampling positions 2000 times for each part (removing repeating samples) has proven to be effective.

Figure 3B:
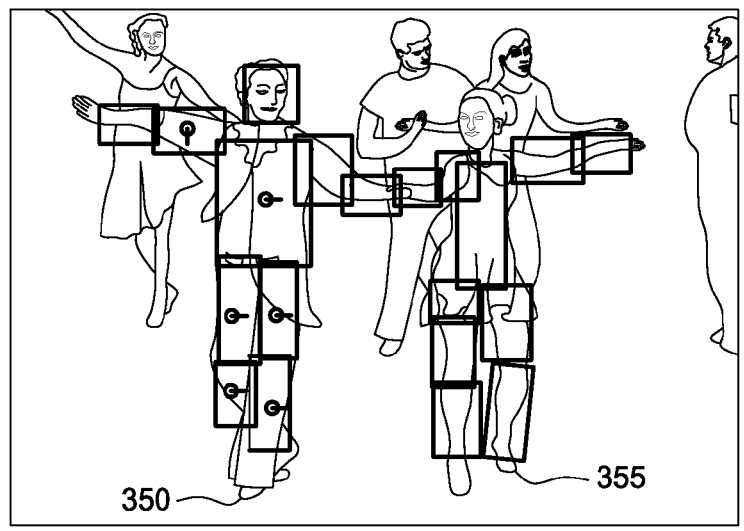
Figure 3C:
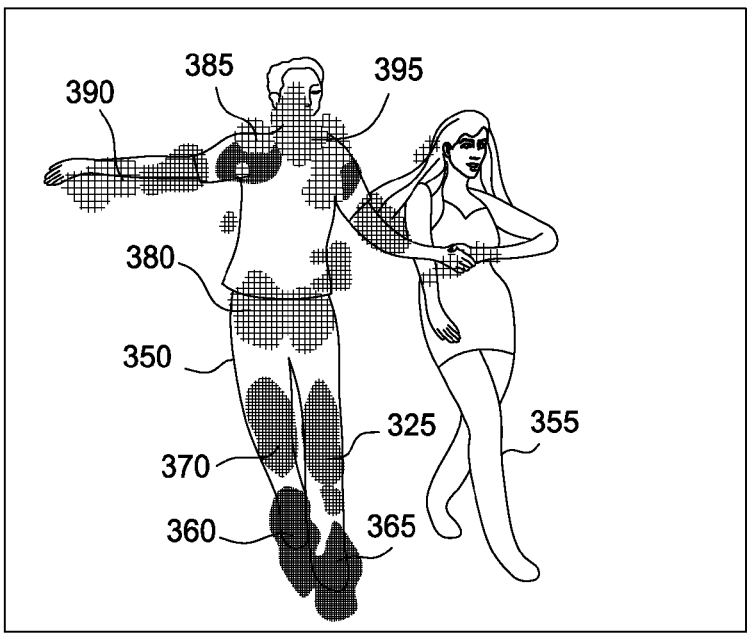

As noted, the inference generated by the multi-person flexible pictorial structural model provides a probability distribution indicating where joints are inferred to be present in an image. Further, the inference is heavily conditioned on the joint activity being engaged in by two (or more) people depicted in the image. This results in a more effective inference of joint position for each person, individually, than may be obtained form prior approaches that evaluate the 2D depiction of each person alone. That is, the mutual context, each depicted person provides for the other, improves accuracy of estimating the positions of 2D joints, as the possible positions are constrained by the joint activity. For example, the positions of two people holding hands constrains the position of the hands in contact, and from this, the position of other joints can more reliably be estimated. FIG. 3B shows another example of this for a couple dancing. As shown, a first dancer 350 is holding hands with a second dancer 355. Additionally, a bounding box showing the predicted location of body parts for both person 350 and 355 has been superimposed over the image. Given the inferred position of the body parts determined using the MaFPS model (based in part on dancing position that include the holding of hands), an estimate joint position is shown in FIG. 3C. The shaded regions 360, 365, 370, 375, 380, 385, 390, and 395, indicate areas of high probability for a depicting a given joint (e.g., a knee, a waist, an elbow, a neck, etc.). For example, regions 360 and 365 correspond to a left and right ankle of dancer 350, regions 370 and 375 correspond to the knees of dancer 350. Regions 380, 385, 390, and 395 correspond to the body joints of dancer 350 covered by a give region. A 2D estimate of joint positions for dancer 355 may be determined in a similar manner.

In addition, as noted, in some cases, the pose of a person engaging in a correlated activity may be occluded, by the other participant in the correlated activity, or by other objects in the field of view of a camera, or by a portion of the person falling outside of the field of view of a camera. In one embodiment, the pose recovery tool 120 may include helper functions configured to interpolate or extrapolate an estimate of 2D pose for portions of an individual that cannot be derived from camera observations directly.

Referring again to method 100 shown in FIG. 1, at step 120, the pose recovery tool estimates a 3D position for multiple joints from the 2D pose estimation determined at step 115. In generating the 3D pose estimate, the pose recovery tool again relies on a model of the correlated activity (e.g., dancing) to more accurately infer a 3D pose from the 2D estimates. More specifically, the pose recovery tool relies on both the 2D joint position probability distributions and a model of the correlated activity to infer a 3D position for a set of joints for a person depicted in an image.

Stated informally, at step 120, the pose recovery tool finds the most probable 3D joint position (as learned form a set of training data) based on the correlated activity and the input 2D joint position estimates. More formally, to estimate 3D poses of interacting people the pose recovery tool may rely on a prior model that incorporates three types of dependencies between subjects: dependencies between body pose, relative orientation, and position between subjects. In one embodiment, a joint Gaussian process dynamical model (GPDM) may be used to capture these dependencies. As is known, a GPDM comprises a low-dimensional latent space with associated dynamics, and a map from the latent space to an observation space. As noted, other statistical models may be used. For example, Gaussian Process Latent Variable Models, Kernel Information Embeddings, Principal Component Analysis, Canonical Correlation Analysis, etc could be used in place of (or in addition to) a Gaussian process dynamical model.

In one embodiment, the GPDM may be trained using motion capture sequence of people engaging in the correlated joint activity having the multi-person interaction dependencies. For example, the GPDM model may be trained on examples of couples dancing (or fighters boxing, or for a particular correlated activity associated with game play for a video game, etc.). Of course, the training data will generally correspond to the correlated joint activity for which 3D pose recovery is desired. In the case of dancing, a GPDM model could be trained for each dance move performed by three or four couples. Doing so results in a model that can generalize across individuals of different dance levels. Of course, the training set could be further adapted or refined for types of dancing, or for other joint activity. That is, the training data used to train the model may be tailored for any given joint activity, where the position and pose of individuals is constrained while participating in the joint activity—as in the case of dancing. For example, the training data for a video game would relate to the specific constraints on joint motion of multiple game participants dictated by the rules/mechanics of a particular game.

Typically, GPDM is used to learn a latent model of motion for a single subject. In one embodiment, the pose recovery tool is configured to learn a joint model over two interacting people. To do so, training samples may be expressed as $Y=Y_1, Y_2, Y_\delta, Y_\theta, Y_{\theta_{1\to2}}$ where $Y_1$ and $Y_2$ are 3D poses of the two subjects, $Y_\delta$ is a relative position of subject two with respect to subject one, $Y_{\theta 1}$ is the root orientation of first subject in a canonical frame of reference and $Y_{\theta_{1\to2}}$ is the orientation of subject two with respect to subject 1. For convenience, all training samples in a training dataset D may be collected into $Y=\{Y\in D\}$.

A joint GPDM model can then be learned by minimizing negative log of posterior:

$$p(X,\bar{\alpha},\bar{\beta}|Y)\alpha p(Y|X,\bar{\beta})p(X|\bar{\alpha})\,p(\bar{\alpha})p(\bar{\beta}) \quad (9)$$

with respect to latent positions, $X\in R^{d_x|D|}$ in the d-dimensional latent space, and hyperparameters $\bar{\alpha}$ and $\bar{\beta}$, $p(Y|X,\bar{\beta})$ is a multivariate Gaussian data likelihood term and $p(X|\bar{\alpha})$ is an isotropic Gaussian prior over the latent trajectories that encodes dynamics in the latent space. Note, that while dynamics in the latent space are typically linear, this results in a non-liner set of poses in the original space, since the mapping from X to Y is non linear.

Note, additional details of Gaussian process dynamical model (GPDM) may be found in Urtasun, R., Fleet, D. J., and Fua, P. "3D people tracking with Gaussian process dynamical models." IEEE Conference on Computer Vision and Pattern Recognition (CVPR), New York, Vol. II, pp. 238-245, 2006, and in T. P. Tian and S. Sclaroff "Fast globally optimal 2D human detection with loopy graph models." In Proc. IEEE Conf. on Computer Vision and Pattern Recognition (CVPR), 2010, both of which are hereby incorporated by reference in their entirety.

In one embodiment, the 3D pose estimation corresponds to finding the most likely values for $Y_1$ and $Y_2$ and the parameters of their projection into the image, Q, given the set of image observations I and the GPDM prior model discussed above; namely, $M_{GPDM}=(X,Y,\bar{\alpha},\bar{\beta})$.

The projection parameters are given by $Q=(r^t, \delta^t, \gamma_1^t, \gamma_t^2, \phi^t)$, where $r^t$ is the position of the first person in frame t, the $\gamma_1^t$ and $\gamma_t^2$ are the scales of first and second person, $\phi^t$ is the absolute rotation of the canonical reference frame for the couple (with respect to which $Y_{\theta 1}$ is defined) and $\delta^t$ is the deviation in the image position of the second person with respect to the position predicted by the projection of $Y_\delta$ into the image. Note, $\delta^t$ allows the pose recovery tool to deviate from the GPDM prior in order to generalize across closer and more distant embraces that may be difficult to explicitly model using only a few motion capture sequence samples. Assuming there is negligible uncertainty in the reconstruction mapping, the 3D pose of both subjects in the canonical space, given a latent pose X, is given by the mean of the Gaussian process: $\mu_Y(X)=\mu+YK_Y^{-1}k_Y(X)$ where $K_Y^{-1}$ is the inverse of a kernel matrix, and $k_Y(X)$ is a kernel vector computed between training points and the latent position X. With this observation the likelihood in Eq. (1) can be expressed directly as a function of latent position X and projection parameters Q. Doing so allows Eq. (1) to be rewritten as:

$$p(\mu_Y(X))Q|I)\alpha p(I|\mu_Y(X),Q)p(Y|X,M_{GPDM}) \quad (10)$$

where $$p(Y|X,M_{GPDM})=\frac{d}{2}\ln\sigma^2(X)+\frac{1}{2}\|X\|^2$$

and $\sigma^2(X)$ is a covariance of a GPDM model defined as $\sigma^2=(X)=k_Y(X,X)-k_Y(X)^T K_Y^{-1} k_Y(X)$.

In one embodiment, the inference or estimate of 3D pose may be generated by directly optimizing Eq. (10) with respect to X and Q using gradient-based continuous optimization (scaled conjugate gradients). In order to define the gradients of the likelihood function Eq. (3) the posteriors of the 2D configurations $L_i$ may be represented using a kernel density estimate given by $pL_1,n(l)=\Sigma_k w_k \exp(\|l-l_{nk}\|)+\epsilon_0$; where $l_{nk}$ are the samples from the posterior of part n used in step 115 of the inference procedure described above and $w_k$ are the value of posterior distribution for this sample. $\epsilon_0=0.02$ is a uniform outlier probability to make the likelihood robust.

Note, in practice, good initialization facilities a rapid convergence of the optimization. Accordingly, in one embodiment, in order to obtain a set of good initial hypothesis, projection parameters Q are initialized from the estimates of people positions given by $D_i$ and a set of candidate poses from the training set with the highest likelihood may then be selected. Further, in some cases, convergence may significantly be sped up by first optimizing the projection parameters Q while keeping the latent positions X constant, and then jointly optimizing the pose and projection parameters.

Further, 3D pose estimation results can be improved by enforcing temporal consistency among individual 3D pose estimates. In one embodiment, this may be achieved by using a continuous optimization over pose trajectory with GPDM prior similar to the procedure above. Further still, in some cases if the confidence of a direct estimate of 3D pose is low or unlivable due to occlusions or field of view limitations, then the pose recovery tool may invoke extrapolation and/or interpolation functions to provide an estimate of 3D pose for some portion of an individual's pose.

Figure 4A:
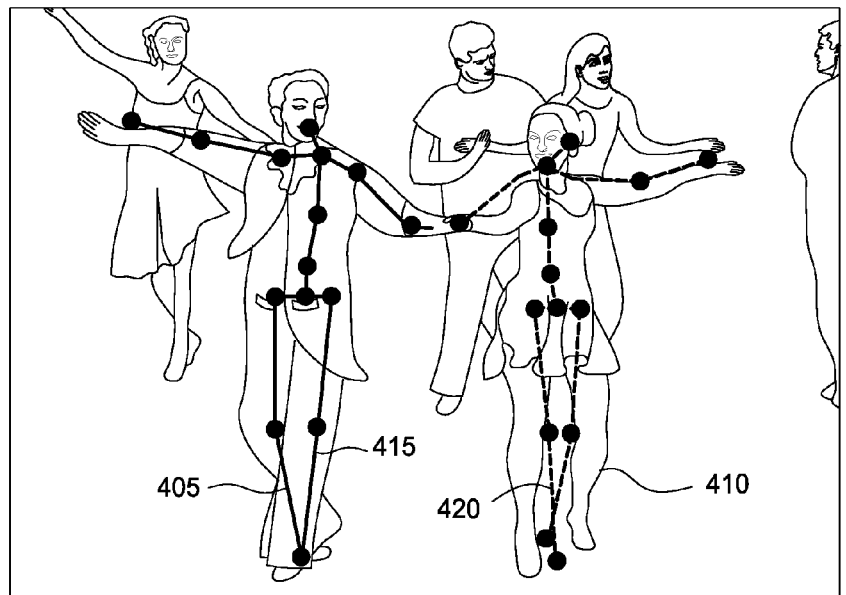
FIGS. 4A-4B illustrate an example of a 3D pose estimate generated from the 2D pose estimates shown in FIGS. 4A-4B, according to one embodiment of the invention.
Figure 4B:
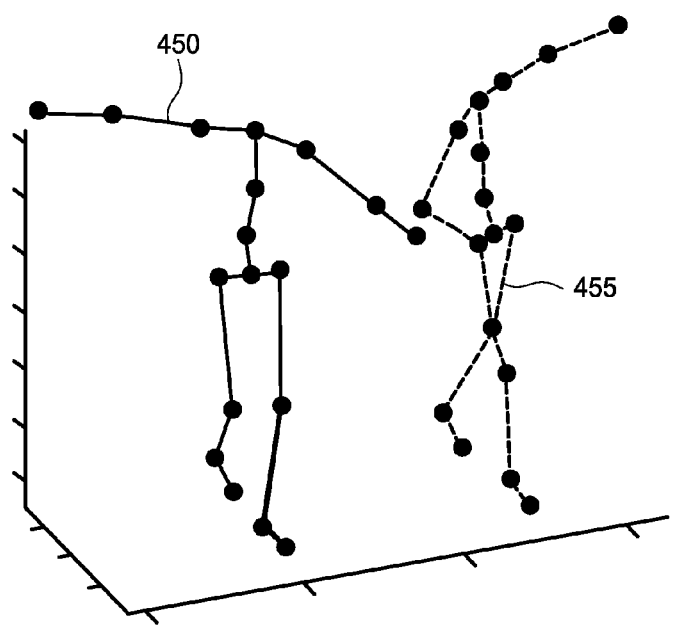

FIGS. 4A-4B illustrate an example of a 3D pose estimate generated from the 2D pose estimates shown in FIGS. 4A-4B, according to one embodiment of the invention. As shown in FIG. 4A, an image 400 again shows first person 4-5 and a second person 410 dancing with one another. Additionally, a 2D skeletal structure 415, 420 is superimposed over the first and second persons 405, 410, respectively. The 2D skeletal structure shows an inferred joint position for several key body joints of the first and second person 405 and 410. FIG. 4B shows a 3D skeletal structure 450 and 455 derived from the 2D inferred joint positions 415 and 420 shown in FIG. 4A, respectively. As described, a GPDM model may be trained using examples of a correlated multi-person activity (e.g., dancing). Once trained, the GPDM model may infer 3D joint position from 2D estimates. Importantly, because the GPDM model captures pose dependence that result from the joint activity, the 3D pose estimates may converge both more rapidly and more accurately.

Figure 5:
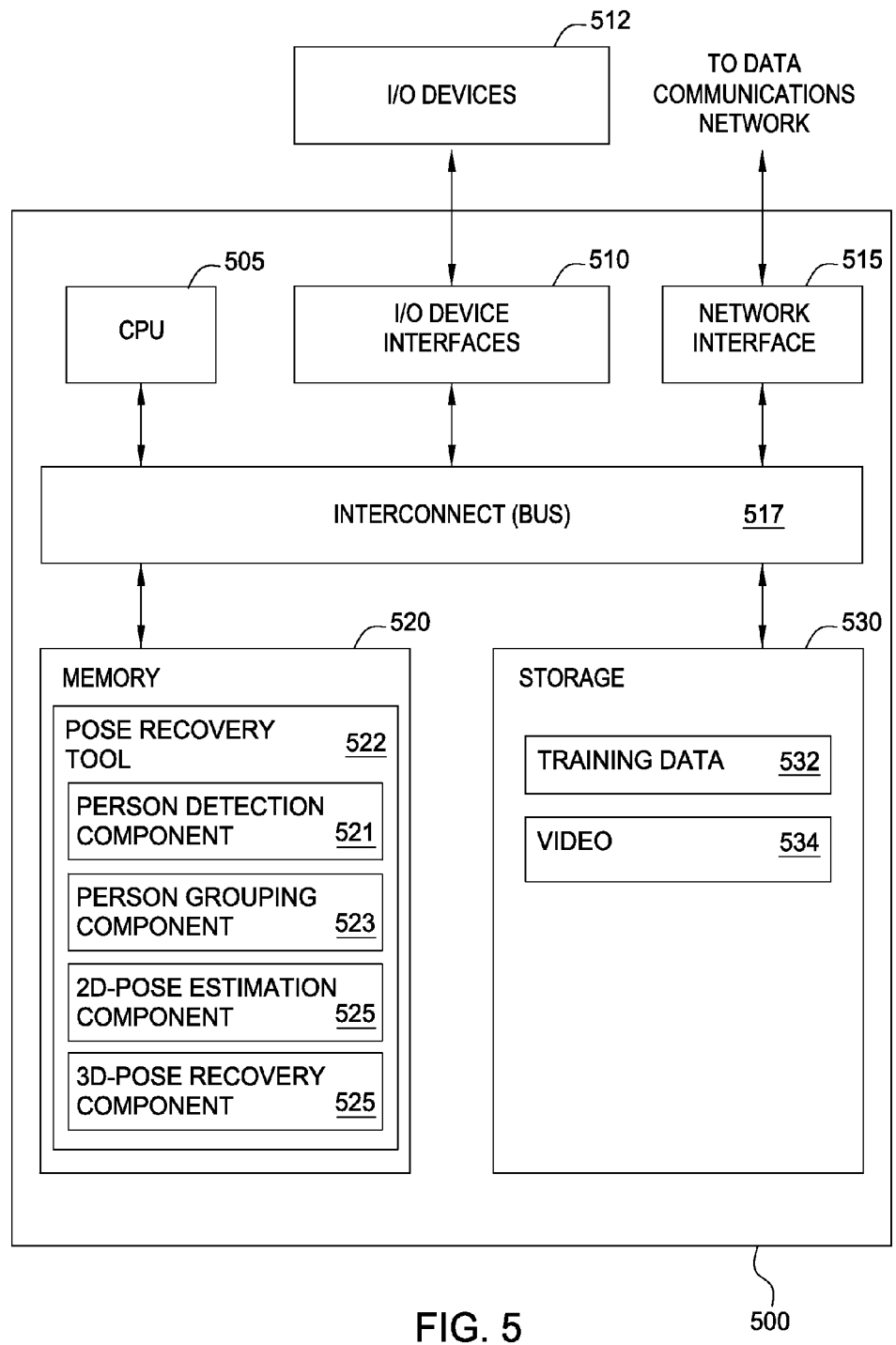
FIG. 5 illustrates an example computing system configured according to an embodiment of the invention.

FIG. 5 illustrates an example computing system 500 configured according to an embodiment of the invention. As shown, the computing system 500 includes, without limitation, a central processing unit (CPU) 505, a network interface 515, a bus 517, a memory 520, and storage 530. The computing system 500 also includes an I/O device interface 510, connecting the computing system 500 to I/O devices 512 (e.g., keyboard, display and mouse devices). The computing system 505 provides a computing system which allows a user to generating pixel velocity maps, for animating 2D line work and for generating 2D silhouettes for frames of rendered 3D geometry.

CPU 505 retrieves and executes programming instructions stored in the memory 520. Similarly, CPU 505 stores and retrieves application data residing in the memory 520. The bus 517 is used to transmit programming instructions and application data between the CPU 505, I/O devices interface 510, storage 530, network interface 515, and memory 520. CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as magnetic disc drives, solid state drives (SSD), removable memory cards, optical storage, network attached storage (NAS), or a storage area-network (SAN).

Illustratively, the memory 520 includes pose recovery tool 522, which itself includes a person detection component 521, a person grouping component 523, a 2D pose estimation component 525 and a 3D pose recovery component 527. And storage 530 includes training data 532 and video data 534. Of course, one of ordinary skill in the art will recognize that the functional components of the pose recovery tool 522 can be implemented using a variety of approaches.

As described above, pose recovery tool 522 provides a software application configured to estimate 3D pose for individuals depicted in 2D (i.e., monocular) images—represented in FIG. 5 as video 534. In particular, where the individuals are engaging in a correlated activity that constrains pose. As a result, the pose recovery tool uses each person as context for the other when estimating 3D pose for the monocular images. In one embodiment, the pose recovery tool may include components which implement steps of the method 100. For example, the person detection component 521 and person grouping component 523 may be configure to detect and track people in recorded video, as described above relative to step 110 of the method 100. Similarly, the 2D pose estimation component 535 may be configured to generate a probability distribution representing probable locations of a variety of body parts (e.g., the 22 part model described above). As noted, the probability distribution may be derived using a multi-aspect flexible pictorial structure model that accounts for constraints in 2D pose that follow from the correlated activity (e.g., dancing).

The output of the 2D pose estimation component 525 may be passed to the 3D pose recovery component 527. The 3D pose recovery component 527 may implement the GPDM model discussed above. The 3D pose recovery component 527 may be trained using training data 532 of the correlated joint activity (e.g., video sequences of different people dancing).

Advantageously, as described, embodiments of the invention provide techniques for the automatic recovery of a three dimensional (3D) pose of multiple subjects interacting with one another, as depicted in a sequence of 2D images. As part of recovering 3D pose estimates, the techniques described herein explicitly account for interactions between people in the recorded video. Individual subjects are treated as mutual "context" for one another. One embodiment provides an automatic framework for estimating 3D pose of interacting people performing complex activities from monocular observations. The framework incorporates and analyzes the role of interactions, in the form of human-human context, at multiple levels of a multilayer process. That is, constraints in pose resulting from individuals engaged in a joint activity (e.g., dancing) is used to guide the recovery of 3D pose estimates from 2D video sequences of individuals engaging in that joint activity.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing two-dimensional (2D) image data, the method comprising:
    identifying, at least a first person and a second person depicted in the 2D image data based on a spatial proximity and a scale of the first and second person in the plurality of 2D images, wherein the 2D image data depicts the first and second person interacting with one another in a correlated activity;
    generating, by operation of one or more computer processors, a 2D pose estimation for at least the first person, wherein the 2D pose estimation is generated, at least in part, to account for constraints on positions of body parts of the first and second person resulting from the first person and second person interacting with one another in the correlated activity.

2. The method of claim 1, wherein the 2D pose estimation provides a probability distribution specifying a probability for each of a plurality of the positions of the body parts as being at a given location in the 2D image data.

3. The method of claim 2, wherein the 2D pose estimation is generated using a multi-person flexible pictorial structure model.

4. The method of claim 1, further comprising:
    generating, from the 2D pose estimation, a three-dimensional (3D) pose estimation, wherein the 3D pose estimation is generated, at least in part, to account for constraints on positions of body parts of the first and second person resulting from interacting in the correlated activity.

5. The method of claim 4, wherein the 3D pose estimation is generated from the 2D pose estimation using a statistical model generated to model pose of individuals interacting in the correlated activity.

6. The method of claim 5, wherein the statistical model is a Gaussian Process Dynamical Model generated to model pose of individuals interacting in the correlated activity.

7. The method of claim 6, further comprising, training the Gaussian Process Dynamical Model using a plurality of example motion capture sequences of individuals interacting in the correlated activity.

8. The method of claim 4, wherein the 3D pose estimation specifies a 3D coordinate position for a plurality of joints of all or sub-set of subjects.

9. The method of claim 1, wherein identifying, at least the first person and the second person depicted in the 2D image data comprises:
    identifying a plurality of persons depicted in a plurality of 2D images; and
    grouping the first and second person into a disjoint group based on the spatial proximity and the scale of the first and second person in the plurality of 2D images.

10. The method of claim 1, wherein generating the 2D pose estimation for the first person includes either interpolating or extrapolating 2D pose for at least a portion of the 2D pose estimation for the first person.

11. A non-transitory computer-readable storage medium storing a program, which, when executed by a processor performs an operation for processing two-dimensional (2D) image data, the operation comprising:
identifying, at least a first person and a second person depicted in the 2D image data based on a spatial proximity and a scale of the first and second person in the plurality of 2D images, wherein the 2D image data depicts the first and second person interacting with one another in a correlated activity;
generating, by operation of one or more computer processors, a 2D pose estimation for at least the first person, wherein the 2D pose estimation is generated, at least in part, to account for constraints on positions of body parts of the first and second person resulting from the first person and second person interacting with one another in the correlated activity.

12. The computer-readable storage medium of claim 11, wherein the 2D pose estimation provides a probability distribution specifying a probability for each of a plurality of the positions of the body parts as being at a given location in the 2D image data.

13. The computer-readable storage medium of claim 12, wherein the 2D pose estimation is generated using a multi-person flexible pictorial structure model.

14. The computer-readable storage medium of claim 11, wherein the operation further comprises:
generating, from the 2D pose estimation, a three-dimensional (3D) pose estimation, wherein the 3D pose estimation is generated, at least in part, to account for constraints on positions of body parts of the first and second person resulting from interacting in the correlated activity.

15. The computer-readable storage medium of claim 14, wherein the 3D pose estimation is generated from the 2D pose estimation using a Gaussian Process Dynamical Model generated to model pose of individuals interacting in the correlated activity.

16. The computer-readable storage medium of claim 15, wherein the operation further comprises, training the Gaussian Process Dynamical Model using a plurality of example video sequences of individuals interacting in the correlated activity.

17. The computer-readable storage medium of claim 14, wherein the 3D pose estimation specifies a 3D coordinate position for a plurality of joints of the first person.

18. The computer-readable storage medium of claim 11, wherein identifying, at least the first person and the second person depicted in the 2D image data comprises:
identifying a plurality of persons depicted in a plurality of 2D images in the 2D image data; and
grouping the first and second person into a disjoint group based on the spatial proximity and the scale of the first and second person in the plurality of 2D images.

19. The computer-readable storage medium of claim 11, wherein generating the 2D pose estimation for at least the first person includes either interpolating or extrapolating 2D pose for at least a portion of the 2D pose estimation.

20. A system, comprising:
a processor; and
a memory, wherein the memory includes an application program configured to perform an operation for processing two-dimensional (2D) image data, the operation comprising:
identifying, at least a first person and a second person depicted in the 2D image data based on a spatial proximity and a scale of the first and second person in the plurality of 2D images, wherein the 2D image data depicts the first and second person interacting with one another in a correlated activity, and
generating, by operation of the processor, a 2D pose estimation for at least the first person, wherein the 2D pose estimation is generated, at least in part, to account for constraints on positions of body parts of the first and second person resulting from the first person and second person interacting with one another in the correlated activity.

21. The system of claim 20, wherein the 2D pose estimation provides a probability distribution specifying a probability for each of a plurality of the positions of the body parts as being at a given location in the 2D image data.

22. The system of claim 21, wherein the 2D pose estimation is generated using a multi-person flexible pictorial structure model.

23. The system of claim 20, wherein the operation further comprises:
generating, from the 2D pose estimation, a three-dimensional (3D) pose estimation, wherein the 3D pose estimation is generated, at least in part, to account for constraints on positions of body parts of the first and second person resulting from interacting in the correlated activity.

24. The system of claim 23, wherein the 3D pose estimation is generated from the 2D pose estimation using a Gaussian Process Dynamical Model generated to model pose of individuals interacting in the correlated activity.

25. The system of claim 24, wherein the operation further comprises, training the Gaussian Process Dynamical Model using a plurality of example video sequences of individuals interacting in the correlated activity.

26. The system of claim 23, wherein the 3D pose estimation specifies a 3D coordinate position for a plurality of joints of the first person.

27. The system of claim 24, wherein identifying, at least the first person and the second person depicted in the 2D image data comprises:
identifying a plurality of persons depicted in a plurality of 2D images in the 2D image data; and
grouping the first and second person into a disjoint group based on the spatial proximity and the scale of the first and second person in the plurality of 2D images.

28. The system of claim 20, wherein generating the 2D pose estimation for at least the first person includes either interpolating or extrapolating 2D pose for at least a portion of the 2D pose estimation.

* * * * *

UNITED STATES PATENT AND TRADEMARK OFFICE
CERTIFICATE OF CORRECTION

PATENT NO.      : 9,058,663 B2
APPLICATION NO. : 13/444681
DATED           : June 16, 2015
INVENTOR(S)     : Andriluka et al.

It is certified that error appears in the above-identified patent and that said Letters Patent is hereby corrected as shown below:

In the Specification:

Column 6, Line 19, please delete " $p(Lt_1^t, L_2^t, |D_1^t, D_2^t, I)$ "

and insert -- $p(L_1^t, L_2^t, | D_1^t, D_2^t, I)$ -- therefor;

Column 8, Line 5, please delete

" $p(h_\alpha) = p(h_{\alpha_1}^1) \prod_{t=2}^T p(h_{\alpha_t}^t) p(h_{\alpha_t}^t, h_{\alpha t-1}^t)$ "

and insert -- $p(h_\alpha) = p(h_{\alpha_1}^1) \prod_{t=2}^T p(h_{\alpha_t}^t) p(h_{\alpha_t}^t, h_{\alpha_{t-1}}^t)$, -- therefor;

Column 8, Line 17, please delete

" $D(h_{\alpha_1}, h_{\alpha_2}) = \frac{1}{t_2 - t_1} \sum_{t=t_1}^{t_2} \|x(h_{\alpha_1,t}) - x(h_{\alpha_2,t})\|$ "

and insert -- $D(h_{\alpha_1}, h_{\alpha_2}) = \frac{1}{t_2 - t_1} \sum_{t=t_1}^{t_2} \| x(h_{\alpha_1,t}) - x(h_{\alpha_2,t}) \|$, -- therefor;

Column 9, Lines 5-6, please delete

" $L_j^t = (l_{j0}^t, \ldots, l_{jN}^t)$, where $l_{ij}^t = (x_{ij}^t, \theta_{ij}^t, s_{ij}^t)$ ,"

Signed and Sealed this
Twenty-ninth Day of December, 2015

Michelle K. Lee
*Director of the United States Patent and Trademark Office*

CERTIFICATE OF CORRECTION (continued)
U.S. Pat. No. 9,058,663 B2 and insert -- $L_i^t = (l_{i0}^t, \ldots, l_{iN}^t)$, where $l_{ij}^t = (x_{ij}^t, \theta_{ij}^t, s_{ij}^t)$, -- therefor;

Column 9, Line 13, please delete "$p(L_i^t | I) \alpha p(I^t | L_i^t) p(L_i^t)$,"

and insert -- $p(L_i^t | I) \alpha p(I^t | L_i^t) p(L_i^t)$, -- therefor;

Column 9, Line 18, please delete "$p(I^t | l_i^t)$" and insert -- $p(I^t | l_i^t)$ -- therefor;

Column 10, Line 48, please delete "$l_{i0}^t$" and insert -- $l_{i0}^t$ -- therefor;

Column 10, Line 49, please delete "$p(l_{i0}^t)$" and insert -- $p(l_{i0}^t)$ -- therefor;

Column 10, Line 50, please delete "$p(l_{i0}^t | D_i^t)$" and insert -- $p(l_{i0}^t | D_i^t)$ -- therefor;

Column 11, Line 4, please delete

"$p(L_1^t, L_2^t | I^t, a^t) \alpha p(I^t | L_1^t) p(L_1^t, L_2^t | a^t)$,"

and insert -- $p(L_1^t, L_2^t | I^t, a^t) \alpha p(I^t | L_1^t) p(I^t | L_2^t) p(L_1^t, L_2^t | a^t)$, -- therefor;

Column 11, Line 12, please delete

"$p(L_1^t, L_2^t | a^t) = \prod_{i=1}^{2} p(L_i^t) \prod_{(n,m) \in W} p(l_{1n}^t, l_{2m}^t)^{d_{nm}^t}$,"

and insert -- $p(L_1^t, L_2^t | a^t) = \prod_{i=1}^{2} p(L_i^t) \prod_{(n,m) \in W} p(l_{1n}^t, l_{2m}^t)^{d_{nm}^t}$, -- therefor;

Column 11, Line 20, please delete

"$p(l_{1n}^t, l_{2m}^t) = N(x_{1n}^t - x_{2m}^t | \mu_{nm}, \Sigma_{nm})$,"

CERTIFICATE OF CORRECTION (continued)
U.S. Pat. No. 9,058,663 B2 and insert -- $p(l^t_{1n}, l^t_{2m}) = N(x^t_{1n} - x^t_{2m} | \mu_{nm}, \Sigma_{nm})$ -- therefor;

Column 12, Line 1, please delete "form" and insert -- from -- therefor;

Column 12, Line 44, please delete "form" and insert -- from -- therefor;

Column 13, Lines 53-54, please delete

" $Q = (r^t, \delta^t, \gamma_1^t, \gamma_t^2, \phi^t),$ "

and insert -- $Q = (r^t, \delta^t, \gamma_1^t, \gamma_t^2, \varphi^t),$ -- therefor;

Column 13, Line 67, please delete

" $\mu_Y(X) = \mu + YK_Y^{-1} k_Y(X)$ where $K_Y^{-1}$ "

and insert -- $\mu_Y(X) = \mu + YK_Y^{-1} k_Y(X)$ where $K_Y^{-1}$ -- therefor;

Column 14, Line 22, please delete

" $pL_1, n(l) = \Sigma_k w_k \exp(\|l - l_{nk}\|) + \epsilon_0;$ where $l_{nk}$ "

and insert -- $pL_1, n(l) = \sum_k w_k \exp(\|l - l_{nk}\|) + \varepsilon_0;$ where $l_{nk}$ -- therefor;

In the Claims:

Column 16, Claim 1, Line 24, please insert -- and -- after ;;

Column 17, Claim 11, Line 14, please insert -- and -- after ;.